United States Patent [19]

Inoue

[11] Patent Number: 4,496,927
[45] Date of Patent: Jan. 29, 1985

[54] MULTILAYER COIL
[75] Inventor: Norikatsu Inoue, Tokyo, Japan
[73] Assignee: Sony Corporation, Tokyo, Japan
[21] Appl. No.: 402,359
[22] Filed: Jul. 27, 1982
[30] Foreign Application Priority Data Sep. 22, 1981 [JP] Japan .................................. 56-150010

[51] Int. Cl.³ ............................................. H01F 27/30
[52] U.S. Cl. ..................................... 336/208; 336/222
[58] Field of Search ............... 336/188, 189, 208, 220, 336/222; 242/7.03, 7.15, 7.16

[56] References Cited

U.S. PATENT DOCUMENTS 2,381,782  8/1945  Stephens .......................... 336/189 X
3,851,830 12/1974  Barthalon ......................... 336/189 X

FOREIGN PATENT DOCUMENTS 1314759 12/1962  France ................................ 336/189
546096  12/1954  Italy .................................... 336/189
588158   6/1959  Italy .................................... 336/188

Primary Examiner—A. D. Pellinen
Assistant Examiner—Susan Steward
Attorney, Agent, or Firm—Lewis H. Eslinger; Alvin Sinderbrand

[57] ABSTRACT

A multilayer coil is formed from a single conductor wire having first (beginning) and second (terminating) lead wires, the conductor wire being first formed as a coil winding with a plurality of layers such that the coil winding has a thickness so as to form an outer peripheral wall, with the first lead wire extending from an inner portion of the coil winding and the second lead wire extending from the outer peripheral wall, and the first lead wire is then wound as an additional layer on the coil winding so that the free end of the first lead wire also extends from the outer peripheral wall.

8 Claims, 16 Drawing Figures

MULTILAYER COIL

BACKGROUND OF THE INVENTION

This invention relates generally to multilayer coils and, more particularly, is directed to a multilayer coil for use with a DC motor.

It is known in the art to construct a flat brushless DC motor which generally includes at least one pair of permanent magnet north and south pole pieces secured to the rotor, and corresponding energizable coils mounted on the stator in opposing relation to the permanent magnet pole pieces, with each coil having conductor segments for carrying current in directions which are normal to the magnetic flux generated by the permanent magnet pole pieces. With such an arrangement, the rotor is caused to rotate relative to the stator by a torque produced by the interaction of magnetic flux generated by the magnet pole pieces and the current flowing through the coils, with the direction of rotation being perpendicular both to the direction of magnetic flux and the direction of current flow.

In flat brushless DC motors, each coil may be formed with a plurality of layers, that is, as a multilayer coil having a substantially constant or uniform thickness so that the air gap between each coil and the permanent magnet pole pieces is also substantially constant or uniform. It is to be appreciated that for multilayer coils, each coil is formed of a continuous conductor wire so as to have a first or beginning lead wire and a second or terminating lead wire, the first one of which terminates at the inner periphery of the respective multilayer coil and the second one of which terminates at the outer periphery of the respective coil, the first and second lead wires being supplied with a sinusoidal current for energizing the coil. However, in order to supply the sinusoidal current to both lead wires, the first lead wire is generally led from the inner periphery of the coil to the outside of the coil. It is to be appreciated that the first lead wire must therefore cross over the coil winding, and this crossing over occurs in the air gap between the respective coil and the permanent magnet pole pieces. Since the gap is required to be of a constant or uniform width and of a relatively small dimension, the crossing over of the first lead wire in the gap results in non-uniformity of the gap width and requires the gap width to be increased, which results in a decrease in the efficiency of the motor.

Further, the first lead wire must be adhered to the surface of the coil in the gap by an adhesive agent to prevent centrifugal force of the motor from moving the lead wire, possibly into contact with the rotor magnet. The use of such adhesive, however, results in further non-uniformity of the gap width so that the distance between the rotor and stator must be still further increased.

It has therefore been proposed to provide each multilayer coil on a printed circuit board with the first inner lead wire being soldered to the printed circuit board at the interior of the coil. In this manner, the first lead wire does not cross over the coil, and therefore, does not require an increase in the gap width. It is to be appreciated, however, that the inner area of each coil is relatively small, and accordingly, soldering of the coil to the printed circuit board may result in damage to the coil as a result of the intensive heat thereat.

OBJECTS AND SUMMARY OF THE INVENTION

Accordingly, it is an object of this invention to provide a multilayer coil that avoids the above-described difficulties encountered with the prior art.

More particularly, it is an object of this invention to provide a multilayer coil for a DC motor having a substantially constant thickness and which has an outer peripheral wall from which both lead wires thereof extend.

It is another object of this invention to provide a multilayer coil for a DC motor which does not require an increase in the air gap between the multilayer coil and a permanent magnet of the DC motor.

It is still another object of this invention to provide a multilayer coil which is relatively easy and economical to manufacture.

In accordance with an aspect of this invention, a multilayer coil includes a conductor having first and second lead wires and formed as a coil winding with a plurality of layers, the coil winding having a thickness so as to form an outer peripheral wall and the first and second lead wires extending from the outer peripheral wall.

In accordance with another aspect of this invention, a method of forming a multilayer coil includes the steps of first winding a conductor having first and second lead wires with respective free ends, as a coil winding with a plurality of layers such that the coil winding has an inner portion and a thickness so as to form an outer peripheral wall, and the first lead wire extends from the inner portion and the second lead wire extends from the outer peripheral wall; and secondly winding the first lead wire as another layer on the coil winding so that the free end of the first lead wire extends from the outer peripheral wall.

The above, and other, objects, features and advantages of the invention, will be apparent in the following detailed description of illustrative embodiments of the invention which is to be read in connection with the accompanying drawings.

DETAILED DESCRIPTION OF THE PREFERRED EMBODIMENTS

Figure 1:
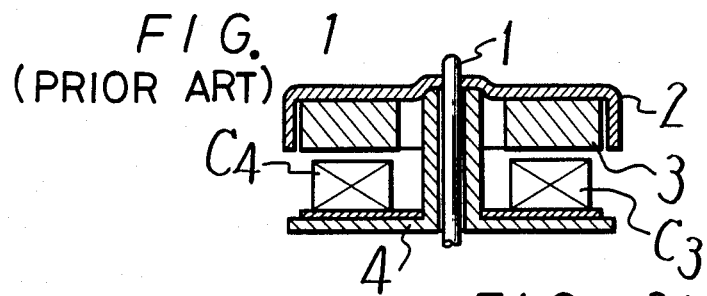
FIG. 1 is a schematic cross-sectional view of a known brushless DC motor with which a multilayer coil according to the present invention can be used.
Figure 2:
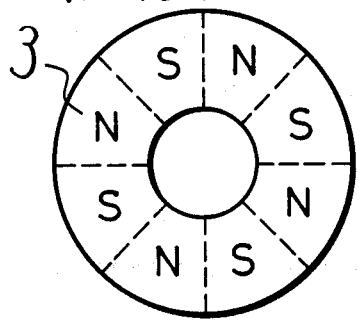
FIG. 2 is a schematic plan view of one embodiment of an annular permanent magnet that can be used with the DC motor of FIG. 1.
Figure 3:
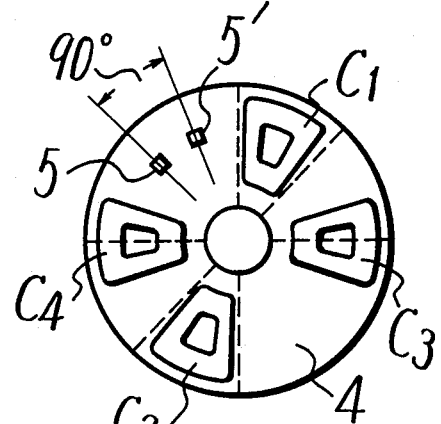
FIG. 3 is a schematic plan view illustrating one arrangement for two-phase drive windings that can be used in the DC motor of FIG. 1.

Referring to the drawings in detail, and initially to FIG. 1 thereof, a known flat brushless DC motor is schematically shown and is adapted to be driven, for example, by a two-phase alternating current. The motor includes a rotor drive shaft 1 rotatably supported in a cylindrical shaft support by bearings (not shown). In a known manner, a disc-like rotor yoke 2 is secured to the upper end of rotor shaft 1 and an annular or ring-shaped permanent magnet 3 is secured to the underside of rotor yoke 2 by any suitable means, such as bonding, so that the annular undersurface of magnet 3 is in a plane orthogonal to the axis of rotor shaft 1. Annular rotor magnet 3 is preferably a permanent magnet which is magnetized in the axial direction of drive shaft 1 and has a plurality of magnetic poles, for example, eight poles of alternating north and south polarities, in the annualar direction thereof, as shown in FIG. 2, so as to generate a sinusoidal wave magnetic field.

The DC motor also includes a stator 4 having drive windings constituted by two pair of multilayer stator coils $C_1$, $C_2$ and $C_3$, $C_4$, respectively. Coils $C_1$ and $C_2$ are arranged in diametrically opposed relation on the surface of stator 4 so as to be spaced apart from each other by a positional angle of 180°. Coils $C_3$ and $C_4$ are likewise diametrically arranged on stator 4. Further, coils $C_1$ and $C_2$ are connected in series and are electrically in phase. Coils $C_3$ and $C_4$ are also connected in series and are electrically in phase. The coil pair $C_1$, $C_2$ is spaced from the other coil pair $C_3$, $C_4$ by an electrical angle of $N \times 90°$, where N is an odd integerr and where the "electrical" angle is equal to the "positional" angle multiplied by the number of pairs of poles of the permanent magnet. It is to be appreciated therefore that each coil pair forms one phase of the two-phase stator coil arrangement. In this manner, if each coil pair is supplied with a sinusoidal current, a linear torque can be generated between rotor magnet 3 and the two-phase stator coils which results in rotation of rotor shaft 1. In addition, sensing elements, such as Hall-effect elements 5 and 5' are provided on stator 4 in the same phase relation as coil pairs $C_1$, $C_2$ and $C_3$, $C_4$, that is, separated by an electrical angle of $N \times 90°$ where N is an odd integer, for sensing the rotational position of permanent rotor magnet 3 and thereby controlling the currents supplied to coils $C_1$-$C_4$.

Figure 4:
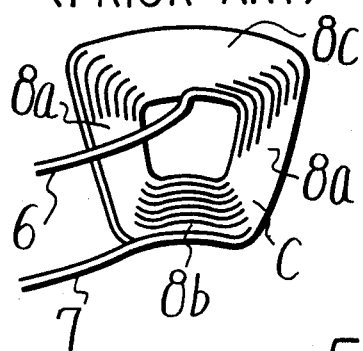
FIG. 4 is a schematic plan view of a multilayer coil according to the prior art.
Figure 5:
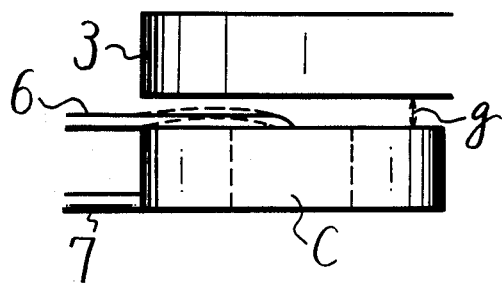
FIG. 5 is a schematic side plan view of a portion of the DC motor of FIG. 1, illustrating the arrangement of the coil of FIG. 4 therein.

Referring now to FIG. 4, a prior art stator coil C that can be used for any one of stator coils $C_1$-$C_4$ in a brushless DC motor of the type shown in FIG. 1 is shown to have a sectorial loop configuration and thus, includes a pair of radial segments 8a, and inner and outer circumferentially extending segments 8b and 8c, respectively, which are connected by the radial segments. The coil is formed of a single conductor wire wound into a multilayer coil and has first and second lead wires 6 and 7 extending from the inner and outer peripheries, respectively, thereof. It is to be appreciated that coil C should have a substantially constant or uniform thickness or height, as shown in FIG. 5, so that when coil C is positioned on stator 4, a relatively small uniform or constant air gap g is formed between the upper surface of the coil and the underside of permanent magnet 3. Thus, a sinusoidal current is applied to first and second lead wires 6 and 7 to produce a rotating magnetic field which develops a linear torque in a given direction on magnet 3, thereby urging rotor 2 to rotate. However, with the arrangement of FIGS. 4 and 5, first lead wire 6 at the inner periphery of the coil must be led to the outside of the coil to be supplied with the sinusoidal current and to be connected to the other coil of the respective pair, and thereby crosses over a radial segment 8a thereof. Thus, when lead wire 6 crosses a radial segment 8a of the coil, because of the thickness of the conductor wire forming the coil and because of the curvature of lead wire 6 in traversing radial segment 8a, as shown by the dashed line in FIG. 5, there results a non-uniformity in the width of air gap g. Since air gap g must have a relatively uniform or constant small width for the DC motor to rotate efficiently, the width of air gap g must be increased, resulting in a decrease in the efficiency of DC motor rotation. Further, if lead wire 6 is secured to radial segment 8a of the coil, an adhesive agent is employed to bond lead wire 6 to radial segment 8a to prevent the centrifugal force of the DC motor from causing lead wire to move, possibly into contact with rotor magnet 3. As a result of the adhesive agent that is employed, a still further increase in the width of air gap g is required. This, of course, results in a further decrease in efficiency of the motor.

Figure 6:
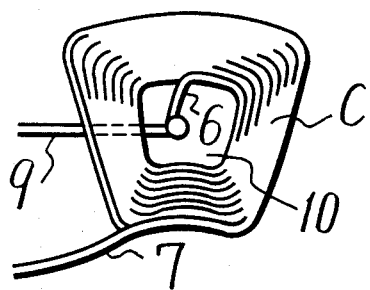
FIG. 6 is a schematic plan view of a known multilayer coil.

In order to overcome the above-described defects, it has been proposed to provide each of the multilayer coils on a printed circuit board, as shown in FIG. 6. In such case, lead wire 6 at the inner periphery of coil C is soldered to a printed conductor 9 on the printed circuit board within an area 10 at the inner periphery of the multilayer coil. It should be appreciated, however, that area 10 within each coil is not very large. As a result, during the soldering operation, the coil may become undesirably heated and thereby become damaged.

Figure 7A:
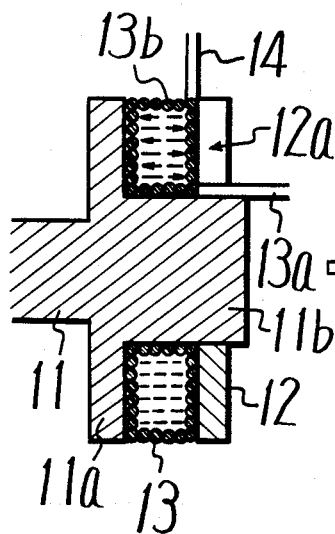
FIGS. 7A–7C are side cross-sectional views of a multilayer coil and a method of manufacturing the same according to one embodiment of this invention.
Figure 7B:
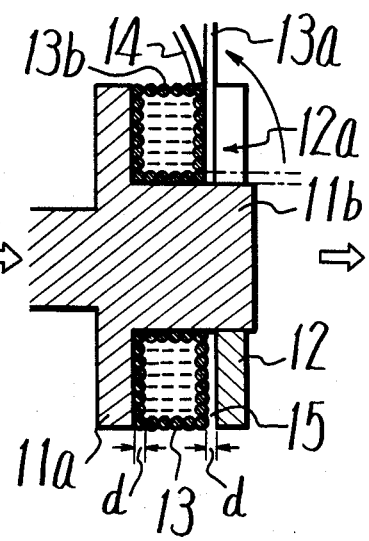
Figure 7C:
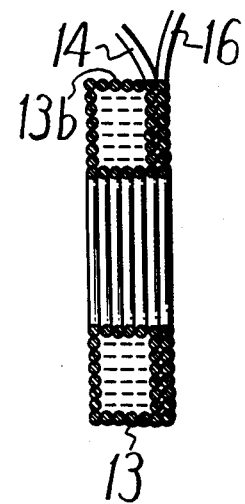

Referring now to FIGS. 7A-7C, a coil winding and a method of manufacturing the same according to one embodiment of this invention will be described. As shown therein, a spool or bobbin 11 of a winding machine is provided with a radial support section 11a and a central core section 11b extending therefrom. An annular frame 12 is slidably positioned along central core section 11b and is moved in the axial direction thereof so as to provide a clearance between radial support section 11a and annular frame 12. A slit 12a is formed in frame 12 in the radial direction thereof and a first or beginning lead wire 13a of a conductor wire 13 used to form the multilayer coil extends from the space between radial support section 11a and annular frame 12 through slit 12a, as shown in FIG. 7A. With first lead wire 13a extending through slit 12a, conductor wire 13 is continuously wound about central core section 11b to form a multilayer coil between radial support section 11a and annular frame 12. In particular, conductor wire 13 is wound about central core section 11b in the axial direction of central core section 11b to form a first axial column. Thereafter, another axial column is formed surrounding the first axial column. This process is continued with the axial columns being formed in the directions shown by the arrows in FIG. 7A until a so-called alignment multilayer coil is completed. It is to be appreciated that the second or terminating lead wire 14 at the opposite end of conductor wire 13 extends from the outer peripheral wall 13b of the multilayer coil. Upon completion of the above steps, annular frame 12 is moved in the axial direction away from the multilayer coil by a distance approximately equal to the diameter d of conductor wire 13 to form a gap 15, as shown in FIG. 7B. First lead wire 13a of conductor wire 13, which extends through slit 12a, is then moved in the direction of the arrow shown in FIG. 7B into gap 15 and wound about central core section 11b within gap 15 so as to form another layer on the multilayer coil. Thus, the layers of the multilayer coil are arranged in regular radially successive relation, so that they may be said to be stratified. It is to be appreciated that, with such arrangement, the free end or lead terminal 16 of lead wire 13a also extends from outer peripheral wall 13b of the multilayer coil, as shown in FIG. 7C. In this manner, both lead wires of the multilayer coil extend from outer peripheral wall 13b thereof so that a substantially uniform or constant thickness is maintained in the multilayer coil, and therefore, since lead wire 13a does not cross over a radial segment of the coil, air gap g is also maintained with a substantially uniform or constant width. In this manner, the air gap g can be maintained at a substantially uniform or constant small dimension to provide greater operating efficiency for the DC motor. Further, with such arrangement, the lead wires of the multilayer coil can easily be connected with external circuitry to be supplied with a sinusoidal current. It is to be appreciated that, since the multilayer coil shown in FIG. 7C is formed as a bobbinless and flangeless coil, conductor wire 13 used to wind the multilayer coil is secured together as a unitary coil by means of an adhesive agent or the like formed in spaces between the wound conductor wire.

Figure 8:
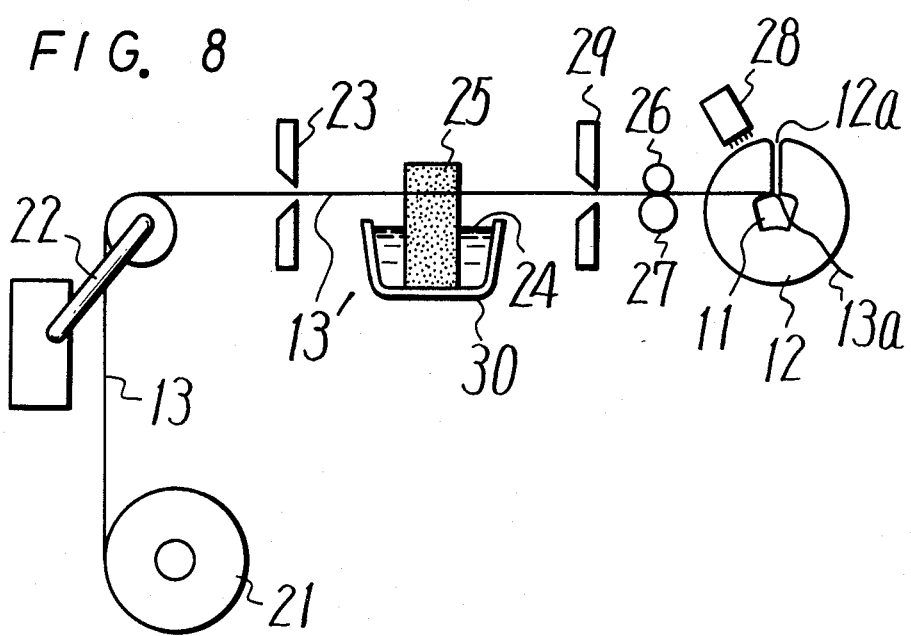
FIG. 8 is a schematic diagram of a portion of apparatus used to manufacture the multilayer coil according to the present invention.

Referring now to FIG. 8, a portion of an apparatus used to form the multilayer coil of FIG. 7C includes a wire spool 21 around which conductor wire 13 is wound. Conductor wire 13 is supplied from wire spool 21 through a tension regulator 22 to a wire peeling cutter 23 which removes the insulated coating material from conductor wire 13 to provide a bare wire 13'. A container 30 is provided having a liquid-phase adhesive agent 24 and a felt material 25 therein, and wire 13' is passed through felt material 25 and thereby impregnated with the liquid-phase adhesive agent 24. Wire 13' is then supplied through a cutter 29, between a feed roller 26 and a contact roller 27 positioned in opposing relation to each other, and then wound upon bobbin 11 of the winding machine, in the manner previously discussed in regard to FIGS. 7A-7C. An air blower 28 is also provided for blowing heated air onto conductor wire 13' to dry the adhesive agent coated thereon. It is to be appreciated, however, that liquid-phase adhesive agent 24 is used with a non-self-melting wire. However, when conductor wire 13' is a self-melting wire, alcohol or the like will replace liquid-phase adhesive agent 24 in container 30.

Figure 9A:
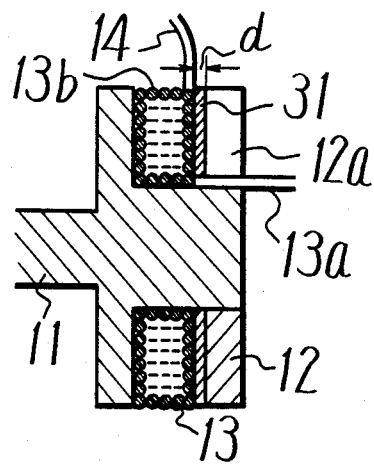
FIGS. 9A and 9B are side cross-sectional views of the multilayer coil of FIGS. 7A–7C and a method of manufacturing the same according to another embodiment of this invention.
Figure 9B:
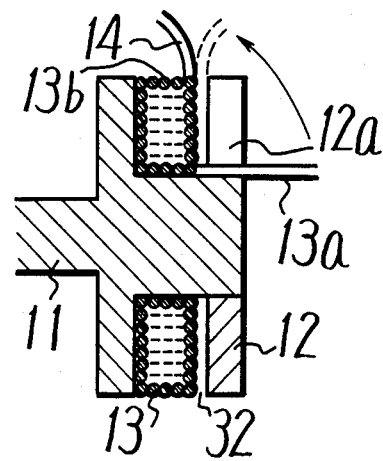

Referring now to FIGS. 9A and 9B, a method of manufacturing the multilayer coil of FIG. 7C according to another embodiment of this invention will be described, in which elements corresponding to those previously described in regard to the embodiment of FIGS. 7A-7C are described by the same reference numerals, and a detailed description thereof will be omitted herein for the sake of brevity. In particular, with the method according to FIGS. 9A and 9B, a spacer 31 having a thickness substantially equal to the diameter d of conductor wire 13 is provided between annular frame 12 and radial support section 11a of bobbin 11. Accordingly, after conductor wire 13 is wound so as to form that portion of the multilayer coil shown in FIGS. 7B and 9A, spacer 31 is removed to provide a gap 32, similar to the aforementioned gap 15, as shown in FIG. 9B. The beginning or first lead wire 13a of conductor 13 is then moved in the direction shown by the arrow in FIG. 9B into gap 32 and wound about central core section 11b within gap 32 to form the multilayer coil according to the present invention, as shown in FIG. 7C. It is to be appreciated tht, in this case, annular frame 12 need not be moved in the axial direction after forming that portion of the multilayer coil shown in FIGS. 7B and 9A. In this manner, a bobbinless and flangeless multilayer coil according to the present invention can be easily formed.

Figure 10:
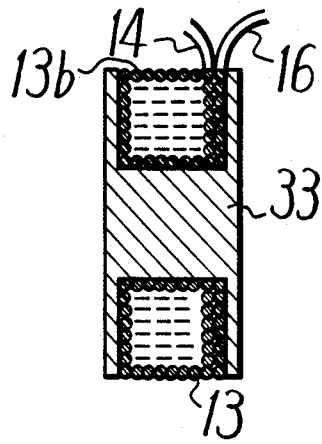
FIGS. 10-13 are side cross-sectional views of multilayer coils according to other embodiments of this invention.

It is to be appreciated that, while the previous embodiments of the invention have dealt with flangeless and bobbinless multilayer coils, the multilayer coil according to the present invention can be formed with or without a flange and with or without a bobbin. For example, as shown in FIG. 10, a multilayer coil according to another embodiment of this invention is formed with a bobbin 33 having radial flanges extending therefrom. It is to be appreciated that bobbin 33 and the flanges extending therefrom can be integrally molded as a unitary piece. The multilayer coil of FIG. 10 can be formed by providing a spacer 31 in much the same manner as previously described in regard to FIG. 9A.

Figure 11:
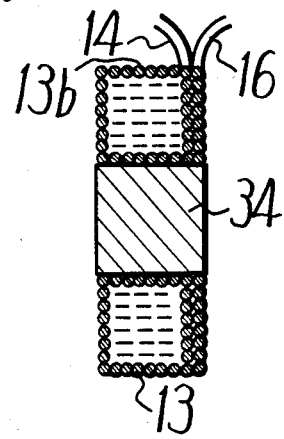
Figure 12:
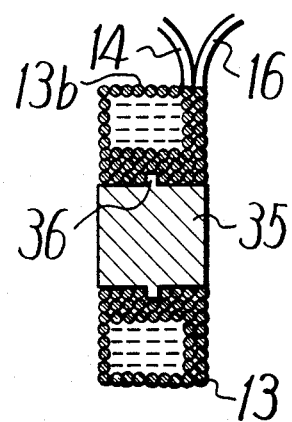
Figure 13:
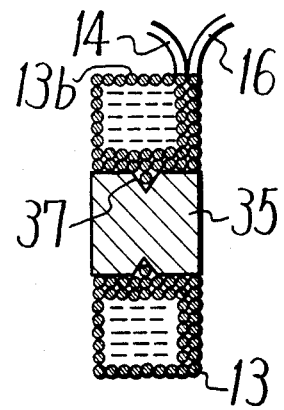

A multilayer coil according to still another embodiment of the present invention is shown in FIG. 11 with a flangeless bobbin 34. Since no flange is provided with the multilayer coil of FIG. 11, the multilayer coil therein can be formed by the method shown in FIGS. 7A-7C or with a spacer 31, as shown in FIGS. 9A and 9B. Where a multilayer coil according to the present invention is formed with a flangeless bobbin, it may be necessary to provide some means for preventing the multilayer coil from disengaging from the flangeless bobbin. Accordingly, as shown in FIG. 12, a projection or protrusion 36, which may be annular, is provided centrally of a flangeless bobbin 35 to prevent disengagement of the multilayer coil therefrom. In like manner, as shown in FIG. 13, a concave notch or recess 37, which also may be annular, is provided centrally in flangeless bobbin 35 on which the multilayer coil is wound.

It is to be appreciated that, with all of the above embodiments according to the present invention, the beginning (first) and terminating (second) lead wires of the multilayer coil extend from the external peripheral wall of the multilayer coil. Accordingly, neither of the lead wires crosses over any portion of the multilayer coil so that the dimension or width of gap g between the coil and the rotor magnet does not change. In addition, because both wires extend from the outer peripheral wall of the multilayer coil, connection of the lead wires to external circuitry for providing a sinusoidal current to the coil, is easily achieved. It is to be appreciated, however, that the multilayer coil according to the present invention is not limited for use as the stator coil for a DC motor.

Having described specific preferred embodiments of the invention with reference to the accompanying drawings, it is to be understood that the present invention is not limited to those precise embodiments, and that various changes and modifications may be effected therein by one skilled in the art without departing from the scope or spirit of the invention as defined in the appended claims.

What is claimed is:

1. A multilayer coil comprising:
   a conductor having first and second lead wires and formed as a coil winding including a plurality of layers providing said coil winding with a substantial thickness with an outer peripheral wall of said coil winding being defined by an outermost one of said layers, and said first and second lead wires both being integrally formed with and extending from said outermost layer of said peripheral wal such that neither of said first and second lead wires crosses over any of said layers so that each of said layers lies substantially flat.

2. A multilayer coil according to claim 1; in which said coil winding is formed as a bobbinless coil winding.

3. A multilayer coil according to claim 1; in which said coil is formed with a bobbin.

4. A multilayer coil according to claim 3; in which said bobbin includes at least one flange.

5. A multilayer coil according to claim 3; in which said bobbin has an outer circumference about which said coil winding is formed, and a projection is formed on said outer circumference.

6. A multilayer coil according to claim 3; in which said bobbin has an outer circumference about which said coil winding is formed, and a recess is formed in said outer circumference.

7. A multilayer coil according to claim 1; in which said conductor is formed from a self-melting wire.

8. A multilayer coil, comprising:
   a wire-like conductor having opposite end portions forming a plurality of successive radially stratified substantially helical windings terminating in an outermost winding having one of said end portions extending outwardly therefrom;
   said helical windings having opposed end faces; and
   a generally spiral winding extending from an innermost of said helical windings and arranged against one of said end faces in successive radially stratified loops so as to terminate in an outermost loop radially coinciding with said outermost helical winding with the other of said end portions extending outwardly therefrom,
   said outermost helical winding and said outermost loop defining an outer peripheral wall of said coil.

* * * * *